No. 639,246. Patented Dec. 19, 1899.
S. R. KAGARIER.
ANIMAL TRAP.
(Application filed Sept. 15, 1898.)

(No Model.)

Witnesses
J. P. Britt
Chas. T. Brock

Inventor
Samuel R. Kagarier,
by
O'Meara & Co.
Attorneys

THE NORRIS PETERS CO., PHOTO-LITHO., WASHINGTON, D. C.

UNITED STATES PATENT OFFICE.

SAMUEL R. KAGARIER, OF SALEMVILLE, PENNSYLVANIA.

ANIMAL-TRAP.

SPECIFICATION forming part of Letters Patent No. 639,246, dated December 19, 1899.

Application filed September 15, 1898. Serial No. 691,018. (No model.)

*To all whom it may concern:*

Be it known that I, SAMUEL R. KAGARIER, a citizen of the United States, residing at Salemville, in the county of Bedford and State of Pennsylvania, have invented a new and useful Animal-Trap, of which the following is a specification.

My invention relates to certain improvements in animal-traps, the object of the invention being to generally improve, cheapen, simplify, and increase the effectiveness of this class of devices.

With this object in view my invention consists in the improved construction, arrangement, and combination of parts hereinafter fully described and afterward particularly pointed out in the claims.

In order to enable others skilled in the art to which my invention most nearly appertains to make and use the same, I will now proceed to describe its construction and operation, having reference to the accompanying drawings, forming part hereof, in which—

Figure 1:
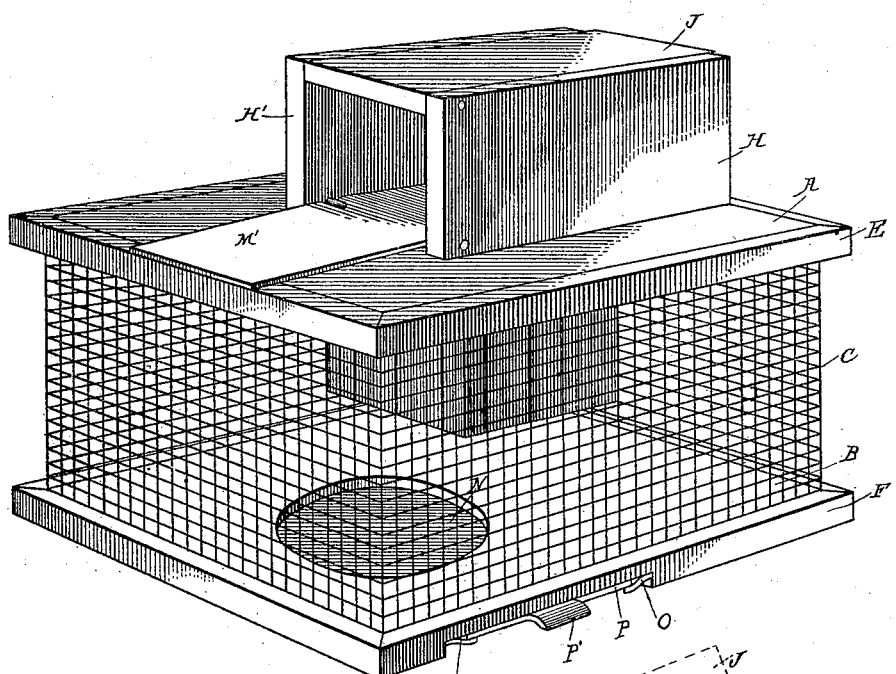
Figure 2:
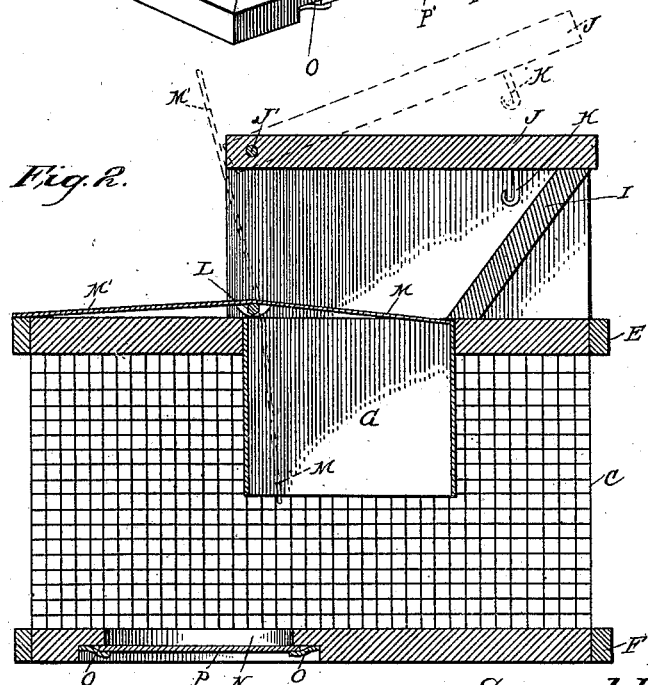

Figure 1 is a perspective view of an animal-trap constructed in accordance with my invention, the trap being illustrated as set and ready for operation. Fig. 2 is a vertical longitudinal section through the same, the trap being illustrated in full lines as set and in dotted lines as sprung and the cover, which also serves as a support for the bait, being shown in full lines as closed and in dotted lines as open.

Like letters of reference indicate the same parts in both figures of the drawings.

Referring to the drawings by letters, A indicates the top, B the bottom, and C the sides and ends, the latter being preferably made of wire-netting or other open-work and the frame, the top, and bottom being made of wood or metal, as may be desired, the netting being secured in position upon the outside edges of the top and bottom A and B by means of strips E and F or in any other suitable manner. In the top A is an opening in which is inserted a box or case G, projecting downward into the main body of the trap, the top and bottom of the box or casing G being open. Mounted upon the top A of the trap are two parallel upright walls or boards H and H', between which is secured an inclined board I, terminating at one edge of the opening through the top. A lid J is pivotally mounted by means of a pin or pintle J' between uprights H and H', and a bait-hook K depends from the lid into the space between the uprights and near the upper end of the incline I. Pivoted between the uprights H and I on a pintle L is a trap-door M, which covers the opening in the top A of the main trap and extends outwardly from its pivot, as at M', a sufficient distance to give it weight enough to normally hold the trap-door in its raised position, in which it closes the opening in the top A.

N indicates an opening through the bottom B of the trap, upon each side of which are slideways O, in which a door or plate P is mounted, which is provided with a handle P' to facilitate opening and closing.

The construction of my invention will be readily understood from the foregoing, and its operation may be described as follows: The lid J is raised and the hook K baited and the lid again closed, in which position the trap is ready for operation. An animal passing over the metal plate M' upon the trap-door M will cause the trap-door to fall into the position indicated by dotted lines in Fig. 2, which will drop the animal into the main body, from which it may be removed, when desired, by opening the slide-door P. Should the animal proceed far enough into the trap to place his feet upon the incline I, it will be unable to secure a hold thereon when the trap-door falls, and the incline will prevent the animal from obtaining a foothold upon the top of the trap beyond the trap-opening. The open top and bottom box G will act as a fender to prevent any attempt of escape from the main trap.

From the foregoing it will be seen that I have produced a simple, cheap, strong, durable, and effective trap composed of a minimum number of inexpensive parts of such form as to permit of all the work of manufacturing being cheaply done by unskilled labor, and while I have illustrated and described the best means now known to me for carrying out my invention I do not wish to be understood as restricting myself to the exact details of construction shown, but hold that any slight variation therefrom such as might suggest itself to the ordinary mechanic would clearly be comprehended in the limit and scope of my invention.

Having thus fully described my invention, what I claim as new, and desire to secure by Letters Patent of the United States, is—

1. In an animal-trap, the combination with a main body provided with an opening in its top surface, of a weighted door pivoted at one edge of the opening, uprights on each side of the opening in which the pivot of the door is engaged, a cover hinged at its front end between said uprights and provided at its rear end with a bait-hook secured in its under surface, and an incline secured between the uprights and terminating at its lower end at the rear edge of the opening in the top of the trap, substantially as described.

2. In an animal-trap, the combination with a main body provided with an opening in its top, a box with open top and bottom inserted in said opening and projecting downward into the main body, uprights raised upon the top of the body on each side of the opening, a lid hinged at its front edge between said uprights, a bait-hook secured in the under surface of the lid near its rear end, an incline secured between the uprights extending from the top of the uprights to the rear edge of the opening in the top of the trap, and a weighted door pivoted between the uprights at one edge of the opening in the top of the trap, substantially as described.

SAMUEL R. KAGARIER.

Witnesses:
  E. H. REED,
  JACOB REED.